United States Patent
Crue, Jr. et al.

(10) Patent No.: US 6,894,877 B1
(45) Date of Patent: May 17, 2005

(54) COMPACT MR WRITE STRUCTURE

(75) Inventors: Bill W. Crue, Jr., San Jose, CA (US); Zhupei Shi, San Jose, CA (US); Lijun Tong, Fremont, CA (US); Carlos Corona, Pleasanton, CA (US)

(73) Assignee: Western Digital Fremont, Inc., Lake Forest, CA (US)

( * ) Notice: Subject to any disclaimer, the term of this patent is extended or adjusted under 35 U.S.C. 154(b) by 224 days.

(21) Appl. No.: 10/112,685

(22) Filed: Mar. 27, 2002

Related U.S. Application Data (62) Division of application No. 09/336,646, filed on Jun. 18, 1999, now Pat. No. 6,466,402.

(51) Int. Cl.$^7$ ............................................. G11B 5/187
(52) U.S. Cl. .................. 360/313; 360/317; 360/122; 360/126; 360/254; 360/264
(58) Field of Search .................... 360/122, 126, 360/254, 264, 294.3, 313, 317, FOR 204, 360/FOR 205; 29/603.03, 603.07, 603.11, 29/603.14

(56) References Cited

U.S. PATENT DOCUMENTS

| | | |
|---|---|---|
| 4,839,197 A | 6/1989 | Henderson |
| 4,841,402 A | 6/1989 | Imanaka et al. |
| 4,841,624 A | 6/1989 | Togawa et al. |
| 5,241,440 A | 8/1993 | Ashida et al. |
| 5,325,254 A | 6/1994 | Cooperrider |
| 5,649,351 A | 7/1997 | Cole et al. |
| 5,653,013 A | 8/1997 | Gill et al. |
| 5,809,636 A | 9/1998 | Shouji et al. |

FOREIGN PATENT DOCUMENTS

JP      2-201710      *  9/1990

* cited by examiner

*Primary Examiner*—A. Dexter Tugbang
(74) *Attorney, Agent, or Firm*—Joshua C. Harrison, Esq.; Milad G. Shara, Esq.; Haynes Beffel & Wolfeld LLP

(57) ABSTRACT

A compact write element includes a conductive shield layer, an insulating write gap layer, a pole pedestal, a coil, and a conductive pole layer, and, in some embodiments also includes a backgap. The pole pedestal and the coil, and, in some embodiments the backgap, constitute a self-aligned array of components that may be formed in a single masking operation to allow for very tight tolerances between the components for a shorter yoke length. The pole layer is substantially flat and parallel to the conductive shield layer, providing for a shorter stack height. Also, a compact MR read/write head includes such a write element and a magnetic data storage and retrieval system includes the compact MR read/write head having such a write element.

12 Claims, 10 Drawing Sheets

COMPACT MR WRITE STRUCTURE

CROSS REFERENCE TO RELATED APPLICATION

This application is a Divisional of U.S. application Ser. No. 09/336,646, filed 18 Jun. 1999 now U.S. Pat. No. 6,466,402, which is hereby incorporated by reference in its entirety.

BACKGROUND OF THE INVENTION

This invention relates generally to magnetic data storage systems, more particularly to magnetoresistive read/write heads, and most particularly to an especially compact write structure.

Figure 1A:
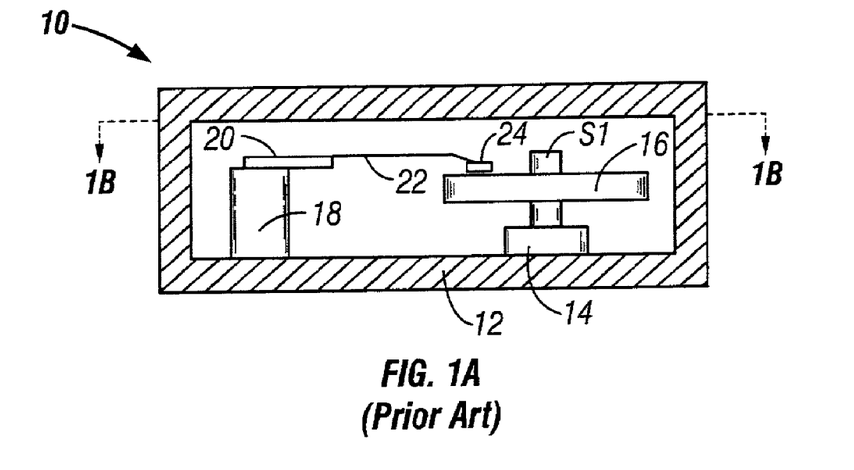
FIG. 1A is a partial cross-sectional elevation view of a magnetic data storage system.
Figure 1B:
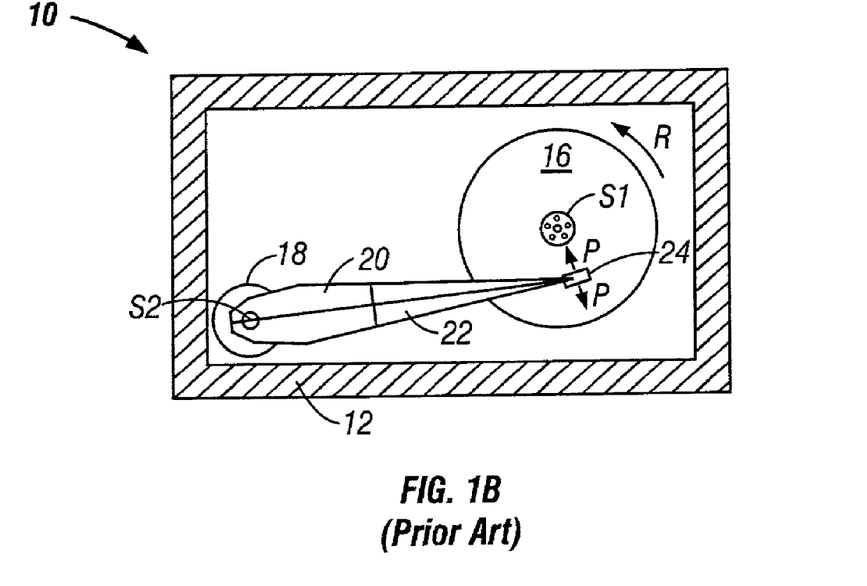
FIG. 1B is a top plan view along line 1B—1B of FIG. 1A.

Magnetic disk drives are used to store and retrieve data for digital electronic apparatuses such as computers. In FIGS. 1A and 1B, a magnetic disk data storage system 10 includes a sealed enclosure 12, a disk drive motor 14, and a magnetic disk, or media, 16 supported for rotation by a drive spindle S1 of motor 14. Also included are an actuator 18 and an arm 20 attached to an actuator spindle S2 of actuator 18. A suspension 22 is coupled at one end to the arm 20, and at its other end to a read/write head or transducer 24. The transducer 24 typically includes an inductive write element with a sensor read element (both of which will be described in greater detail with reference to FIG. 2A). As the motor 14 rotates the magnetic disk 16, as indicated by the arrow R, an air bearing is formed under the transducer 24 causing it to lift slightly off of the surface of the magnetic disk 16, or, as it is sometimes termed in the art, to "fly" above the magnetic disk 16. With the arm 20 held stationary, data bits can be read along a circumferential "track" as the magnetic disk 16 rotates. Further, information from concentric tracks can be read from the magnetic disk 16 as the actuator 18 causes the transducer 24 to pivot in an arc as indicated by the arrows P. The design and manufacture of magnetic disk data storage systems is well known to those skilled in the art.

Figure 2A:
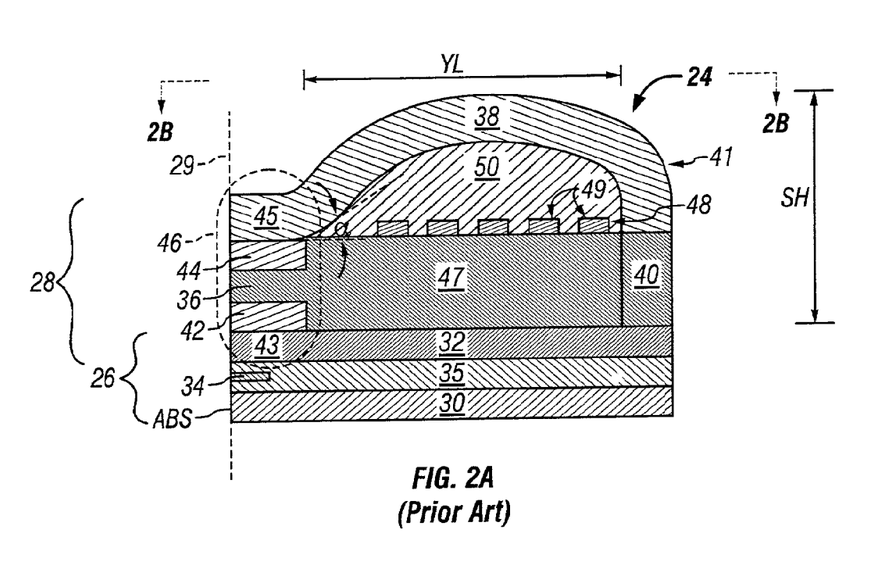
FIG. 2A is a cross-sectional view of a read/write head according to the prior art.

FIG. 2A depicts a magnetic read/write head 24 including a read element 26 and a write element 28. Edges of the read element 26 and write element 28 also define an air bearing surface ABS, in a plane 29, which can be aligned to face the surface of the magnetic disk 16 (see FIGS. 1A and 1B). The read element 26 includes a first shield 30, an intermediate layer 32, which functions as a second shield, and a read sensor 34 that is located within a dielectric medium 35 between the first shield 30 and the second shield 32. The most common type of read sensor 34 used in the read/write head 24 is the magnetoresistive (AMR or GMR) sensor which is used to detect magnetic field signals from a magnetic medium through changing resistance in the read sensor.

The write element 28 is typically an inductive write element which includes the intermediate layer 32, which functions as a first pole, and a second pole 38. A first pole pedestal 42 may be connected to a first pole tip portion 43 of the first pole 32, and a second pole pedestal 44 may be connected to the second pole tip portion 45 of the second pole 38. The first pole 32 and the second pole 38 are attached to each other by a backgap 40 located distal to their respective pole tip portions, 43 and 45. The first pole 32, the second pole 38, and the backgap 40 collectively form a yoke 41 together with the first pole pedestal 42 and the second pole pedestal 44, if present. The area around the first pole tip portion 43 and the second pole tip portion 45 near the ABS is sometimes referred to as the yoke tip region 46. A write gap 36 is formed between the first pole pedestal 42 and the second pole pedestal 44 in the yoke tip region 46. The write gap 36 is formed of a non-magnetic electrically insulating material. This non-magnetic material can be either integral with (as is shown here) or separate from a first insulation layer 47 that lies between the first pole 32 and the second pole 38, and extends from the yoke tip region 46 to the backgap 40.

Also included in write element 28 is a conductive coil layer 48, formed of multiple winds 49. The conductive coil layer 48 is positioned within a coil insulation layer 50 that lies above the first insulation layer 47. The first insulation layer 47 thereby electrically insulates the coil layer 48 from the first pole 32, while the coil insulation layer 50 electrically insulates the winds 49 from each other and from the second pole 38. In some prior art fabrication methods, the formation of the coil insulation layer includes a thermal curing of an electrically insulating material, such as photoresistive "photoresist" material.

Figure 2B:
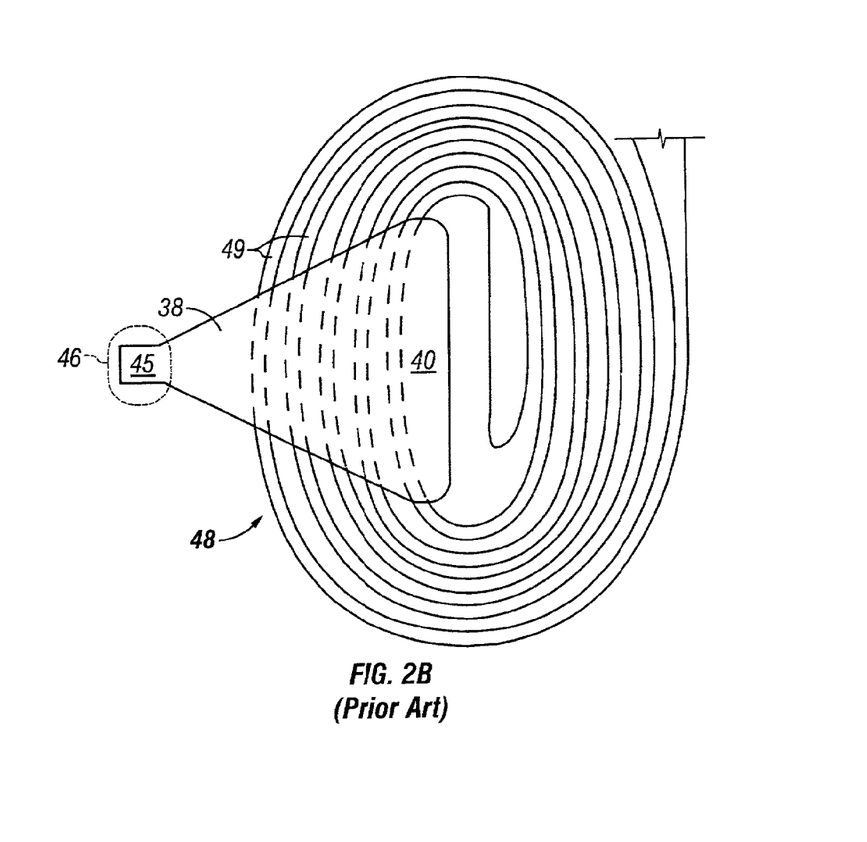
FIG. 2B is a top plan view along line 2B—2B of FIG. 2A.

FIG. 2B shows a plan view of the read/write head 24 taken along line 2B—2B of FIG. 2A. This view better illustrates how the coil layer 48 of write element 28 is configured as a spiral with each wind 49 passing around the backgap 40 and beneath the second pole 38 in the region between the backgap 40 and the second pole tip region 45. Because of the magnetic properties of the yoke 41, when a write current is passed through coil layer 48 a magnetic flux is induced in the first and second poles 32 and 38. The write gap 36, being non-magnetic, allows the magnetic flux to fringe out from the yoke 41, thus forming a fringing gap field. Data may be written to the magnetic disk 16 by placing the ABS of read/write head 24 proximate to the magnetic disk 16 such that the fringing gap field crosses the surface of the magnetic disk 16. Moving the surface of the magnetic disk 16 through the fringing gap field causes a reorientation of the magnetic domains on the surface of the magnetic disk 16. As the magnetic disk 16 is moved relative to the write element 28, the write current in coil layer 48 is varied to change the strength of the fringing gap field, thereby encoding data on the surface of the magnetic disk 16 with a corresponding variation of oriented magnetic domains.

Returning to FIG. 2A, a number of parameters that influence the performance of the write element 28 are also shown. The first of these parameters is the yoke length YL, sometimes defined as the distance from the backgap 40 to the first pole pedestal 42. A shorter yoke length YL favors higher data recording rates as it tends to reduce the flux rise time. The flux rise time is a measure of the time lag between the moment a current passed through coil layer 48 reaches its maximum value and the moment the fringing flux field between the first pole 32 and the second pole 38 reaches its maximum. Ideally, the response would be instantaneous, but various factors such as the physical dimensions and the magnetic properties of the yoke 41 cause the flux rise time to increase. A shorter flux rise time is desirable both to increase the rate with which data may be written to a magnetic disk 16, and also to decrease the length of, and the spacing between, data bits on the magnetic disk 16. Shorter data bits more closely spaced together is desirable for increasing the total storage capacity of the magnetic disk 16.

Write elements according to the prior art are manufactured through common photolithography techniques well known in the art involving repeated cycles of masking with "photoresist," depositing layers of various materials, followed by stripping away remaining photoresist. Each cycle through this process typically fabricates one element of the final structure. Consequently, tolerance for mask misalignment must be accounted for in the designs for these devices. In particular, prior art write elements leave a separation of at least 4 microns between pole pedestals 42 and 44 and the coil layer 48. A similar gap of at least 4 microns is found between the backgap 40 and the coil layer 48. These separations add extra length to the yoke length YL that increases the flux rise time and hinders write performance.

Another parameter of the write element 28 is the stack height SH, sometimes defined as the distance between the top surface of the first pole 32 and the top of the second pole 38, as shown in FIG. 2A. The stack height SH is influenced by the apex angle α, which characterizes the angle of the slope region of the second pole 38 near the yoke tip portion 46 measured relative to a horizontal reference such as the intermediate layer 32. Increasing the stack height SH makes it difficult to control the track width within narrow set tolerances, decreasing the production yield. Consequently, increasing the apex angle α has the effect of increasing the stack height SH to the detriment of write performance.

A further problem associated with the apex angle α relates to the magnetic properties of the second pole 38. Increasing the apex angle α increases the topography over which the second pole 38 must be formed near the yoke tip portion. The second pole 38 is typically formed by sputtering or plating, techniques well suited for producing flat layers, but not as well suited for forming complex surfaces. Consequently, a further problem associated with the apex angle α is lower production yields resulting from the difficulties encountered in producing uniformity in the second pole 38, especially in the slope region. Still another problem associated with apex angle α relates to the magnetic properties of the second pole 38 in the slope region, which will be described with reference to FIGS. 3A–3C.

The trend towards higher density recording in the disk drive industry has forced a number of materials changes in the components of the drives, which has, in turn, created additional problems. In particular, in order to achieve higher data densities on the surface of the magnetic disk 16, the traditional magnetic media have not been found to be sufficient. To obtain smaller bits it has been necessary to develop recording media with higher magnetic coercivities. To write to a magnetic medium with a higher magnetic coercivity requires that the write element 28 produce a stronger fringing flux field. To produce a stronger fringing flux field further requires the use of magnetic materials capable of carrying larger magnetic fluxes. In other words, for high density recording applications, new materials for components of the yoke 41 need to have high magnetic saturation (Bs) values.

Permalloy, a nickel alloy containing 20% by weight of iron, is the material most frequently used to form magnetic components of prior art recording devices. However, Permalloy has an unacceptably low Bs for use in high density recording. Consequently, designers of magnetic recording devices have turned to high Bs materials such as nickel alloys containing between 35% and 55% by weight of iron. Replacing Permalloy with higher Bs materials would be a simple matter except for the issue of magnetostriction.

When a material with a non-zero magnetostriction is subjected to a stress, a magnetic field is produced in response. Similarly, when such a material is placed in a magnetic field, a stress in the material develops. Permalloy has been an advantageous material in magnetic recording devices because it has a magnetostriction value of nearly zero. The higher Bs materials, on the other hand, exhibit much higher magnetostriction values. These higher magnetostriction values create additional problems for high density recording applications.

Figure 3A:
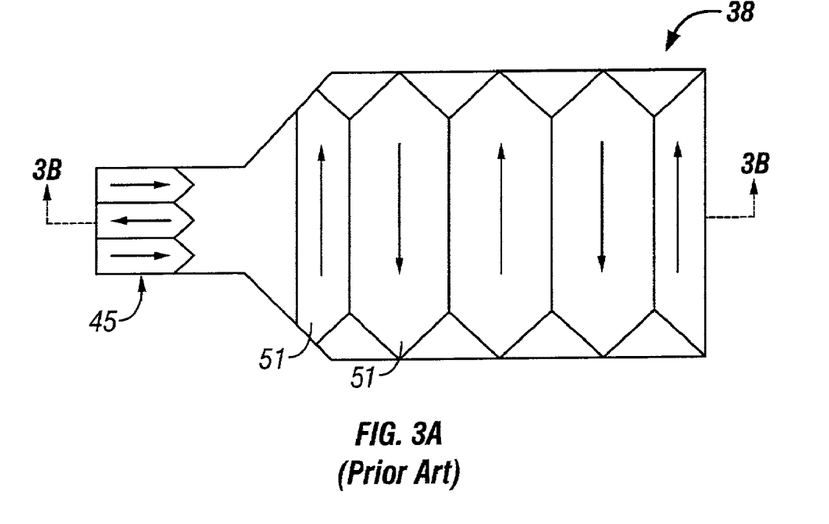
FIG. 3A is a top plan view showing a typical arrangement of magnetic domains at the surface of a prior art second pole.
Figure 3B:
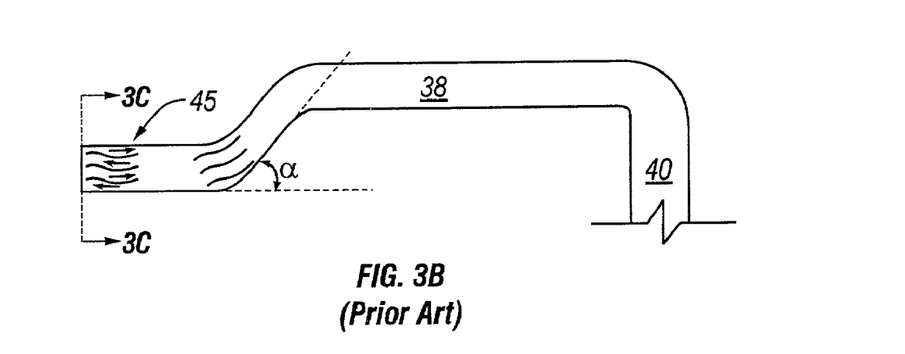
FIG. 3B is a cross-sectional view along the line 3B—3B of FIG. 3A.
Figure 3C:
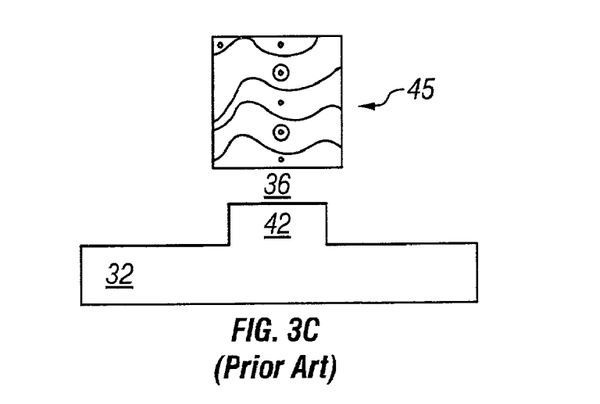
FIG. 3C is an ABS view along the line 3C—3C of FIG. 3B.

FIGS. 3A–3C illustrate how the apex angle α coupled with high Bs materials is problematic for high density recording. FIG. 3A shows a plan view of the second pole 38 showing a typical arrangement of magnetic domains 51 as they appear on the top surface of the second pole 38 when fabricated from high Bs materials. Arrows within the magnetic domains 51 indicate the orientations of the domains' magnetizations. Through much of the body of the second pole 38 the magnetic fields of the domains 51 are favorably oriented perpendicular to the long axis of the second pole 38. However, in the second pole tip region 45 the magnetization of domains 51 are aligned parallel to the long axis of the second pole 38. In the intervening slope region, the magnetic domains are disordered.

FIG. 3B shows a cross-sectional view along the line 3B—3B of FIG. 3A. Similarly, FIG. 3C is an ABS view along the line 3C—3C of FIG. 3B. In FIG. 3C the orientations of the magnetization within the magnetic domains are represented by dots and circled dots. Dots and circled dots show, respectfully, orientations into and out from the plane of the drawing. From FIGS. 3A–3C it can be seen that within the second pole tip region 45 the magnetic domains form a layered structure with magnetization orientations perpendicular to the ABS. This layered structure is sometimes referred to as a striped domain pattern.

It has been found that with increasing apex angle α the stresses in the magnetic film in the slope region of the second pole 38 also increase. Some of the stress in the magnetic film is inherent from the manufacturing process. Additional stresses may increase during the operation of the read/write head 24 as heat is generated within the device and differences in coefficients of thermal expansion between different materials create minor dimensional changes. The retention of photoresist as an insulator in some prior art devices is especially troublesome in this regard, as photoresist has a relatively large coefficient of thermal expansion. Consequently, photoresist retained beneath the second pole 38 has the effect, when the device is in use, of creating especially large stresses in the slope region of the second pole 38. Therefore, since the effect of magnetostriction is to counteract a stress with a magnetic field, undesirable magnetic fields in the slope region of the second pole 38 tend to increase both as the apex angle α increases and when photoresist is retained beneath the second pole 38. These undesirable magnetic fields give rise to the striped domain pattern and disordered domains.

The striped domain pattern in the second pole tip region 45 and the disordered domains in the slope region are detrimental to the performance of the write element 28. In particular, these misoriented domains resist changes in the magnetization of the yoke 41. Consequently, when a write current is introduced into the coil layer 48 and a magnetic field is induced in the yoke 41, the flux rise time is lengthened by the resistance to change of the misoriented domains. Longer flux rise times and poorer performance are, therefore, associated with an increasing apex angle α and with the use of retained photoresist beneath the second pole 38.

Figure 4:
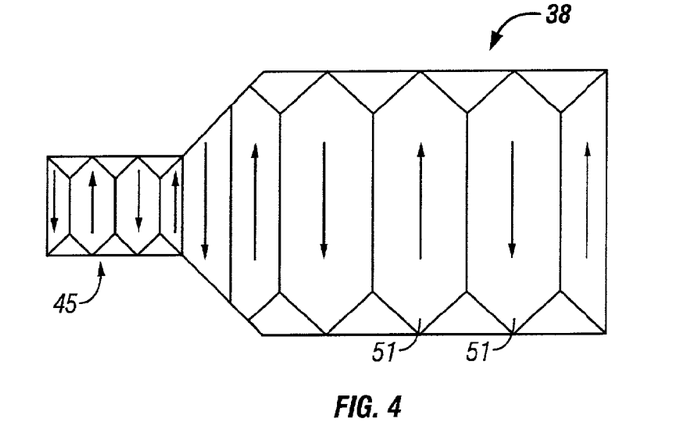
FIG. 4 is a top plan view showing a more desirable arrangement of magnetic domains at the surface of the second pole sought to be achieved by the present invention.

FIG. 4 shows a more desirable arrangement of magnetic domains 51 for the second pole 38. Arrows within the magnetic domains 51 indicate magnetic orientation. With such an idealized arrangement, the magnetization of the yoke 41 should respond more quickly to changes in the write current in coil layer 48, thus improving the write performance of the write element 28 by reducing the flux rise time.

Thus, what is desired is a write element with a substantially flat second pole and a shorter yoke length YL. Such a write element would eliminate the apex angle α, have a smaller stack height SH, and would not have the misoriented magnetic domain problems associated with the slope region. Further, it is desired to be able to fabricate a write element without retaining any photoresist as an insulator. It is additionally desired that fabrication of such a write element should be inexpensive, quick, and simple.

SUMMARY OF THE INVENTION

The present invention provides a compact structure for a write element of a read/write head of a magnetic data storage device. The structure includes both a substantially flat second pole, significantly less space between the coil and the backgap, and significantly less space between the coil and the pole pedestal. Additionally, a method for the fabrication of such a compact write element is provided.

In an embodiment of the present invention a compact magnetic write structure is provided comprising a conductive shield layer defining a plane, an insulating write gap layer at least partially covering the conductive shield layer, a self-aligned array comprising a conductive pole pedestal and a coil, and a conductive pole layer disposed over the coil and contacting the pole pedestal. The conductive pole layer defines a plane substantially parallel to the plane of the conductive shield layer. The separation between the pole pedestal and the coil is no greater than about 2.0 microns. A further embodiment of the present invention includes both a backgap opening in the insulating write gap layer, and a backgap as part of the self-aligned array. The backgap contacts the conductive shield through the backgap opening.

Additional embodiments of the present invention are directed to a compact MR read/write head that further includes a MR read element. The read element itself comprises two conductive shields separated by an insulator layer in which the MR sensor is disposed, and one of the conductive shields also serves as the first pole of the compact magnetic write structure. Still other embodiments are directed to a magnetic data storage and retrieval system additionally incorporating a magnetic medium and a medium support, where the medium support is capable of supporting the magnetic medium and moving it in relation to the read/write head.

This compact magnetic write structure is advantageous because it provides a substantially flat second pole without a slope region. Eliminating the slope region serves to both reduce the magnetostrictive induced resistance to magnetization changes in the yoke, and to reduce the stack height. Both of these changes reduce the flux rise time and improve writing performance. The structure is further advantageous for limiting the separation between the pole pedestal and the coil to no greater than about 2.0 microns, thereby reducing the yoke length for further writing performance enhancement. The embodiment in which the separation between the backgap and the coil to no greater than about 2.0 microns is similarly advantageous for further reducing the yoke length. Still another advantage is the ability to fabricate the structure without retaining photoresist as an insulator. This is also advantageous for lowering the flux rise time by reducing unwanted stresses in high Bs magnetic materials caused by large mismatches in coefficients of thermal expansion.

Yet another embodiment of the present invention is directed to a method for manufacturing a magnetic write structure. The method includes providing a substrate including a conductive shield layer and an insulating write gap layer. The conductive shield layer defines a plane, and the insulating write gap layer at least partially covers the conductive shield layer. The method further includes forming over the substrate a self-aligned array comprising a plurality of components including a conductive pole pedestal and a coil. The pole pedestal and the coil contact the write gap layer, and the separation between the pole pedestal and the coil is no greater than about 2.0 microns. Additionally, the method includes forming a conductive pole layer over the self-aligned array. The pole layer is in contact with the pole pedestal and defines a plane that is substantially parallel to the plane of the conductive shield layer. The present invention further includes a planarization step prior to the formation of the pole layer helping to ensure that the plane of the pole layer is substantially parallel to the plane of the conductive shield layer.

Additional embodiments of this invention are directed to a method for manufacturing a magnetic write structure in which the insulating write gap layer is provided with a backgap opening, the plurality of components of the self-aligned array further includes a conductive backgap, and the conductive backgap is disposed above and contacts the conductive shield layer through the backgap opening. The separation between the backgap and the coil in these embodiments is no greater than about 2.0 microns. In still other embodiments a seed layer is formed above and in contact with the insulating write gap layer.

These methods for manufacturing magnetic write structures are advantageous because they incorporate a self-aligned array. A self-aligned array allows the pole pedestal and the coil to be formed with the same mask, thereby allowing these two components to be formed as close together as masking technology will allow without having to leave excess space between them to allow for the possible misalignment of successive masks. Embodiments incorporating a backgap also take advantage of the self-aligned array to minimize the space between the backgap and the coil. A further advantage of the self-aligned array is that it reduces the total number of masking operations needed to form a magnetic write structure, thus saving time and reducing manufacturing costs.

Another advantage of this manufacturing method derives from the planarization step preceding the formation of the pole layer. The planarization achieves three important goals. The first goal is to expose the backgap and the second pole pedestal. The second is to reduce the overall stack height of the finished write structure, improving the write performance of the finished device. The third goal served by the planarization step is that the pole layer formed over the planarized surface is itself substantially flat and substantially parallel to the plane of the conductive shield layer. This serves to simplify the geometry of the pole layer, thereby reducing or substantially eliminating domain striping and further improving write performance of the finished device.

These and other advantages of the present invention will become apparent to those skilled in the art upon a reading of the following descriptions of the invention and a study of the several figures of the drawing.

BRIEF DESCRIPTION OF THE DRAWINGS

The present invention will be readily understood by the following detailed description in conjunction with the accompanying drawings, and like reference numerals designate like elements.

DETAILED DESCRIPTION OF THE PREFERRED EMBODIMENTS

FIGS. 1A, 1B, 2A, 2B, 3A–3C, and 4 were discussed with reference to the prior art.

Figure 5:
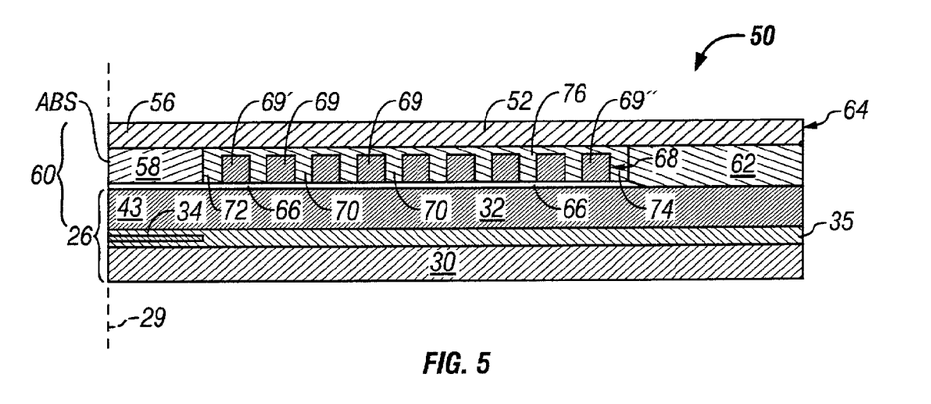
FIG. 5 is a cross-sectional view of a read/write head according to an embodiment of the present invention.

FIG. 5 is a cross-sectional view of a read/write head 50 according to an embodiment of the present invention, including a read element 26 and a write element 60. Edges of the read element 26 and write element 28 also define an air bearing surface ABS, in a plane 29, which can be aligned to face the surface of the magnetic disk 16. The read element 26 includes a first shield 30, a conductive shield layer 32, which functions as a second shield, and a read sensor 34 that is located within a dielectric medium 35 between the first shield 30 and the conductive shield layer 32. Embodiments of the present invention may include a read sensor 34 that may be any type magnetoresistive sensor to detect magnetic field signals from a magnetic disk 16.

The write element 60 includes conductive shield layer 32, which functions as a first pole, and a second pole 52. The conductive shield layer 32 includes a first pole tip portion 43, and the second pole 52 includes a second pole tip portion 56. A second pole pedestal 58 is connected to the second pole tip portion 56 of the second pole 52. The conductive shield layer 32 and the second pole 52 are joined together by a backgap 62 located distal to their respective pole tip portions, 43 and 56. The conductive shield layer 32, the second pole 52, the backgap 62, and the second pole pedestal 58 collectively form a yoke 64. Additional embodiments of the present invention may also include a first pole pedestal (not shown) that may be connected to the first pole tip portion 43 of the conductive shield layer 32. The components of the yoke 64 may be formed from any electrically conductive material, however, high Bs materials such as CoNiFe alloys and nickel alloys containing iron in the 35% to 55% by weight range, such as Ni-35% Fe, Ni-45% Fe, and Ni-55% Fe work well.

The area within the space enclosed by the yoke 64 contains a write gap layer 66, a coil 68 comprising individual winds 69, wind insulators 70, a pole pedestal insulator 72, a backgap insulator 74, and a second pole insulation layer 76. The write gap layer 66 is a continuous film extending from the ABS to the backgap 62. The write gap layer 66 separates the first pole tip portion 43 from the second pole pedestal 58, and the conductive shield layer 32 from the coil 68. The pole pedestal insulator 72 isolates the second pole pedestal 58 from the nearest wind 69' of coil 68. Similarly, the backgap insulator 74 isolates the backgap 62 from the nearest wind 69" of coil 68. The wind insulators 70 separate the individual winds 69 of coil 68 from one another. The second pole insulation layer 76 insulates the second pole 52 from the coil 68. The coil 68 may be made from any conductive material, however, copper works well. Likewise, the write gap layer 66, the wind insulators 70, the pole pedestal insulator 72, the backgap insulator 74, and the second pole insulation layer 76, may be made from any non-magnetic electrically insulating material such as alumina ($Al_2O_3$) or silica ($SiO_2$).

Figure 6A:
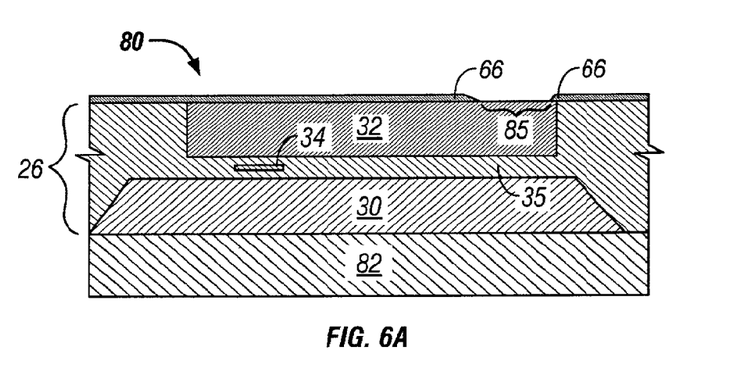
FIGS. 6A–6E are cross-sectional views of a read/write head at various stages of fabrication, according to an embodiment of the present invention.
Figure 6B:
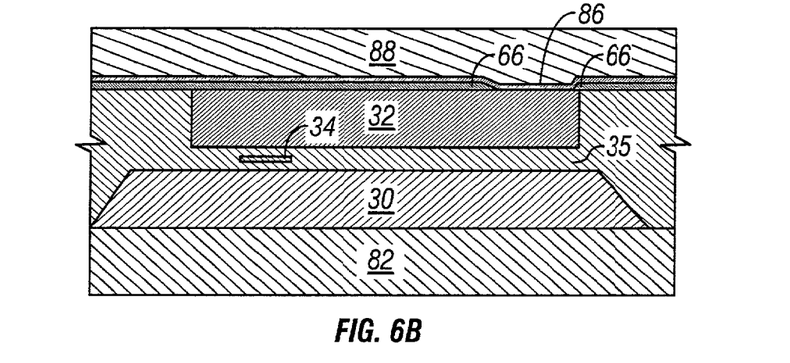
Figure 6C:
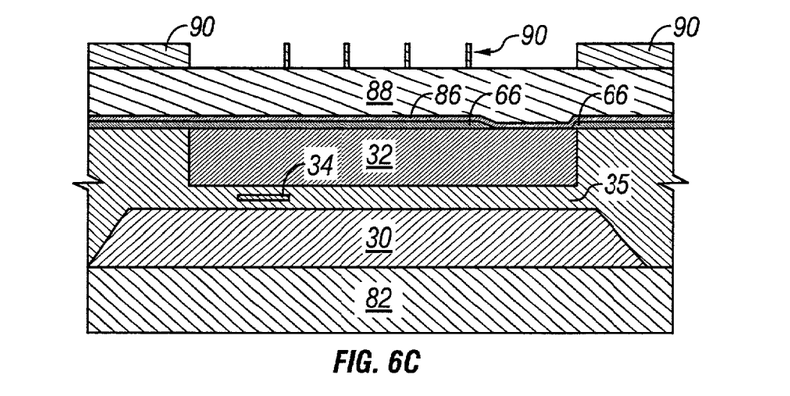
Figure 6D:
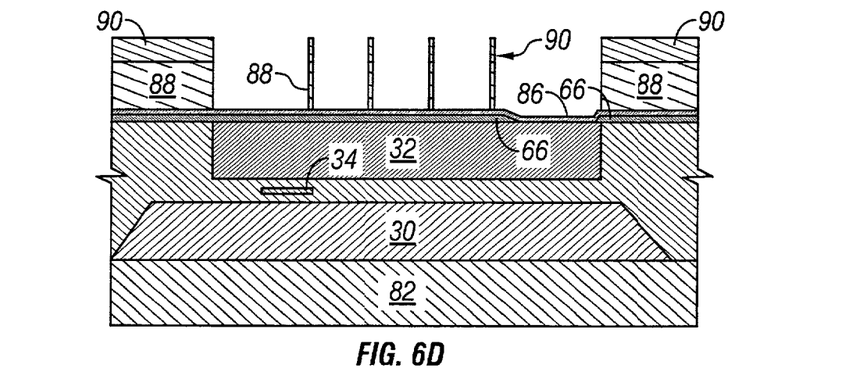
Figure 6E:
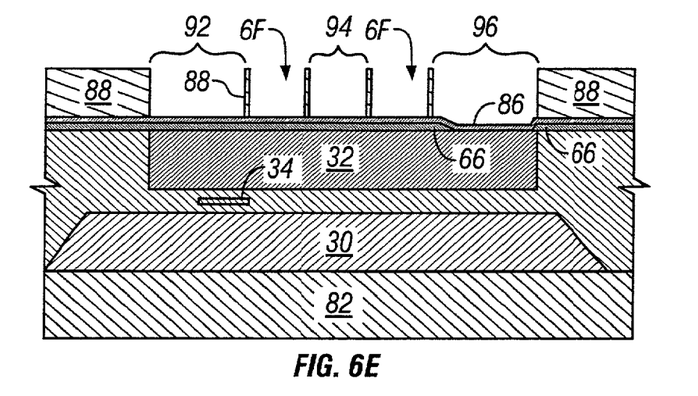
Figure 6F:
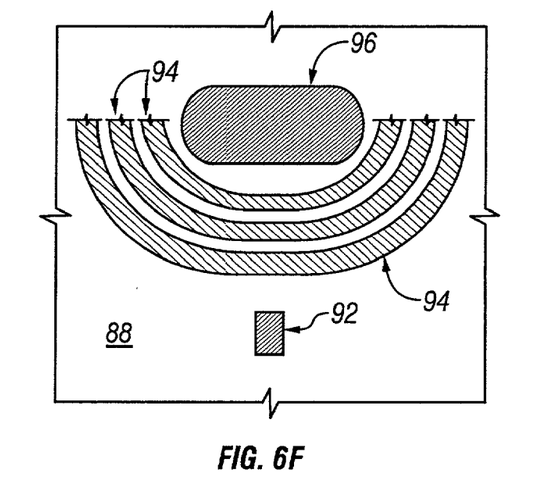
FIG. 6F is a top plan view along the line 6F in FIG. 6E showing the relationship of the components of a self-aligned array according to an embodiment of the present invention.
Figure 6G:
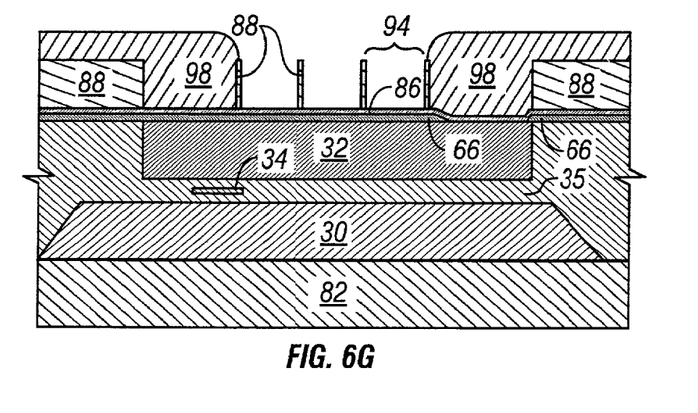
FIGS. 6G–6M are further cross-sectional views of a read/write head at various stages of fabrication, according to an embodiment of the present invention.
Figure 6H:
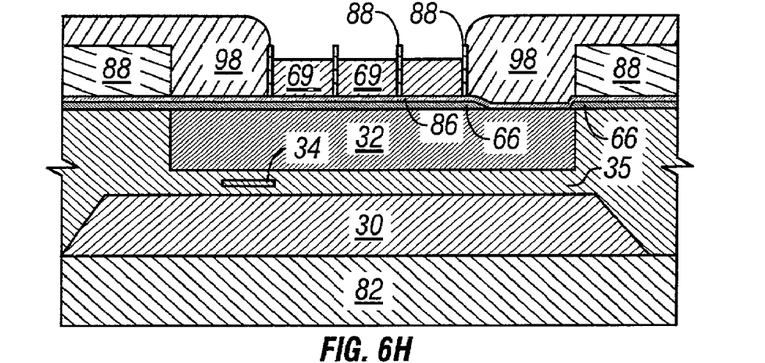
Figure 6I:
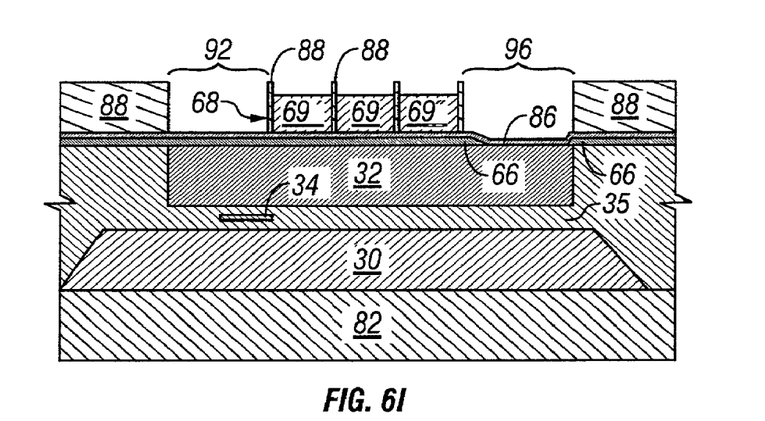
Figure 6J:
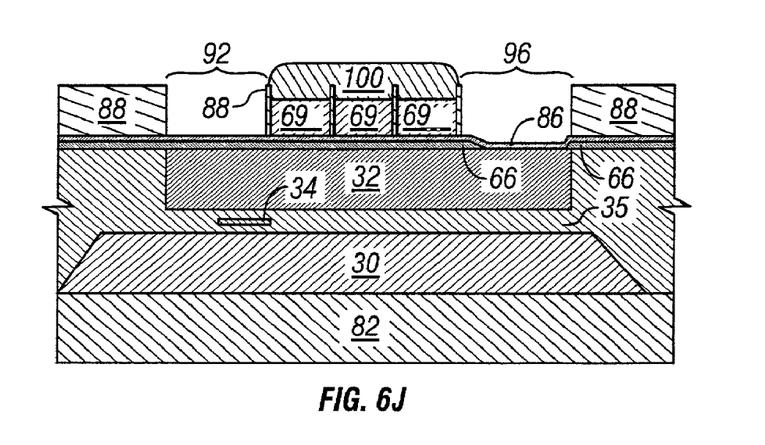
Figure 6K:
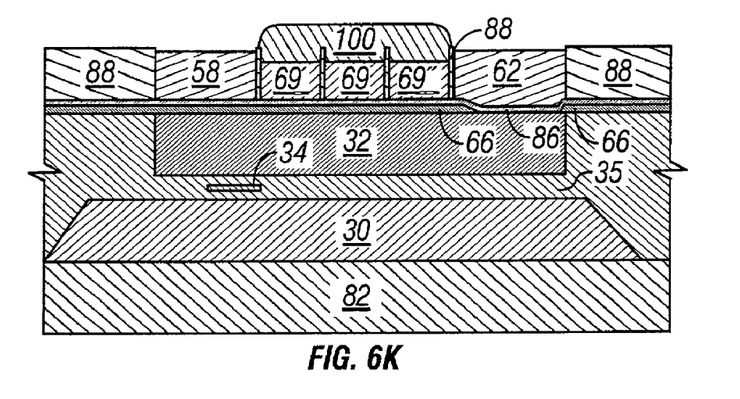
Figure 6L:
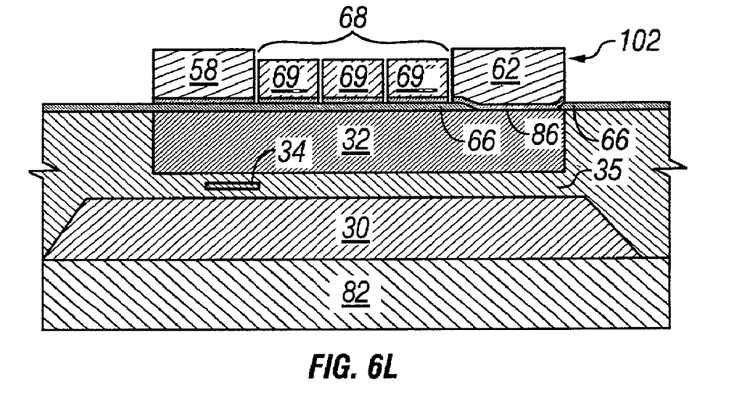
Figure 6M:
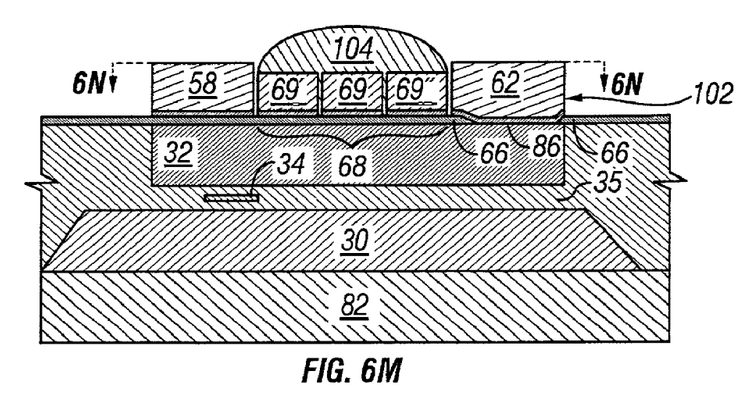
Figure 6N:
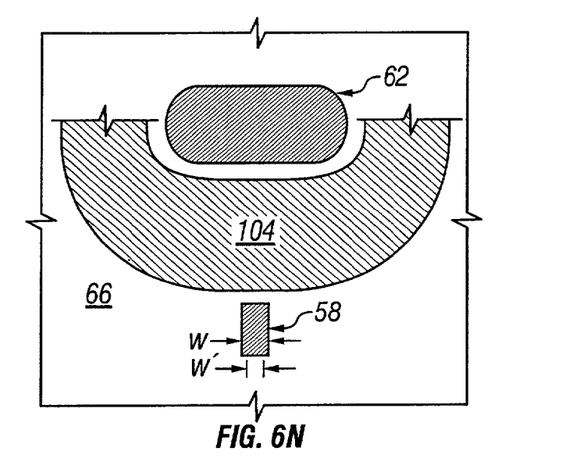
FIG. 6N is a top plan along the line 6N in FIG. 6M illustrating the narrowing of the second pole pedestal according to an embodiment of the present invention.
Figure 6O:
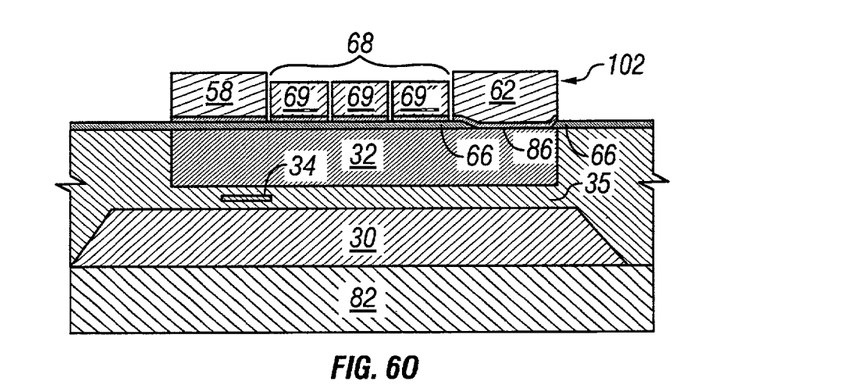
FIGS. 6O–6R are further cross-sectional views of a read/write head at various stages of fabrication, according to an embodiment of the present invention
Figure 6P:
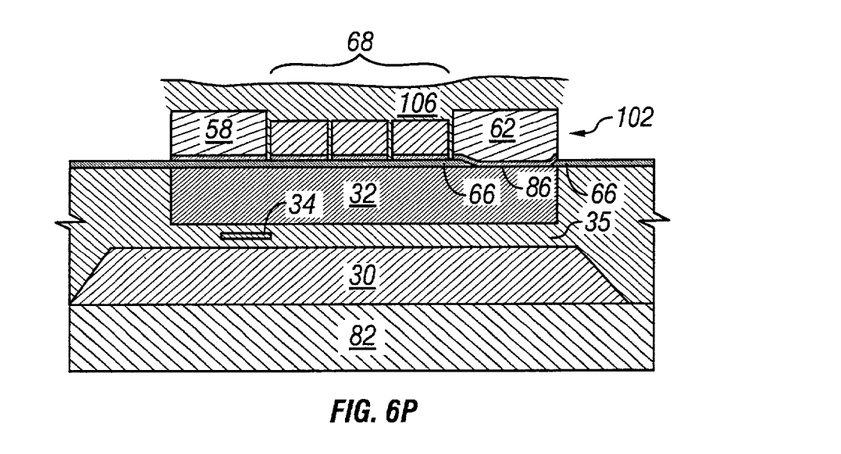
Figure 6Q:
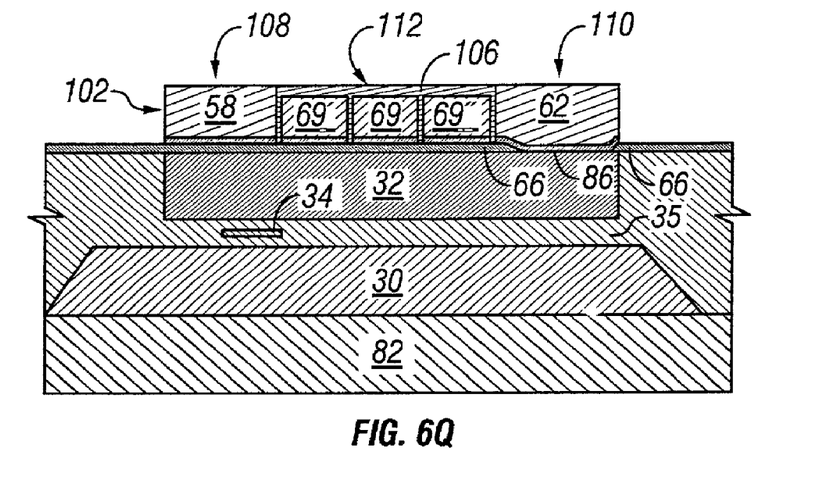
Figure 6R:
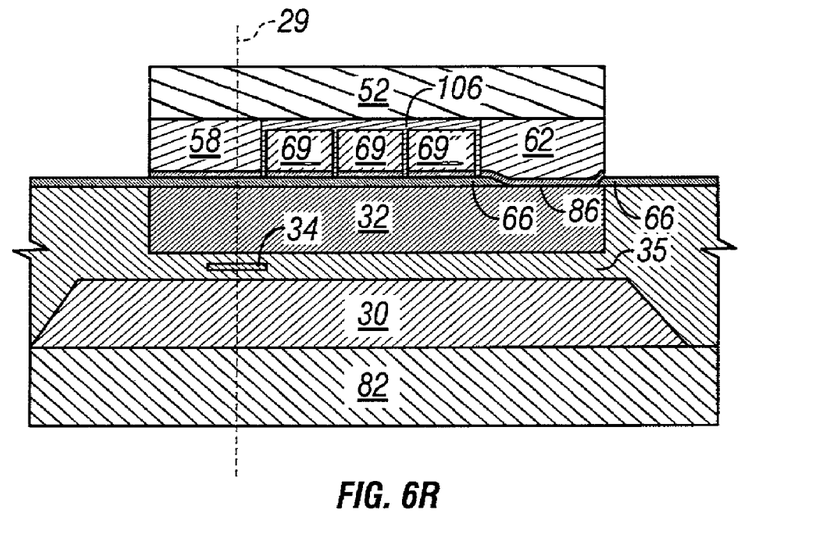

FIGS. 6A–6R illustrate a method for manufacturing a magnetic write structure according to the present invention. FIG. 6A shows the starting point of the process. A substrate 80 is provided including a support member 82, a conductive shield layer 32, and an insulating write gap layer 66 at least partially covering the conductive shield layer 32. Embodiments including a read element 26 will further include within the substrate 80 a first shield 30, and a read sensor 34 located within a dielectric medium 35. The conductive shield layer 32 functions as a second shield for read element 26.

The support member 82 is a base on which a plurality of write structures may be assembled. It should be thick enough to provide good mechanical support for handling. The support member 82 should be substantially flat and chemically inert so that substantially flat layers may be formed above it, and so that those layers do not chemically react with it. Ideally, the support member 82 should also be fairly inexpensive. Silicon wafers are known to work well for support member 82.

The materials and fabrication methods for the first shield 30, the read sensor 34, and the dielectric medium 35 are well known in the art. The conductive shield layer 32 may be formed from any electrically conductive material, however, high Bs materials such as CoNiFe alloys and nickel alloys containing iron in the 35% to 55% by weight range, such as Ni-35% Fe, Ni-45% Fe, and Ni-55% Fe work well for producing write elements for high density recording applications. The conductive shield layer 32 may be formed by any number of common fabrication techniques well known in the art such as plating. The insulating write gap layer 66 may be formed of any electrically insulating material, with alumina and silica commonly used, and may be formed by any well known deposition technique such as chemical vapor deposition (CVD). A backgap opening 85 in the insulating write gap layer 66 is provided in some embodiments. The backgap opening may be formed by common techniques well known in the art such as masking followed, for example, by reactive ion etching (RIE) or wet etching.

FIG. 6B shows the formation of a seed layer 86 above and in contact with the insulating write gap layer 66. The seed layer also covers the conductive shield layer 32 where the conductive shield layer 32 is exposed by an opening in the insulating write gap layer 66. The seed layer 86 may improve the adhesion of subsequent metallic layers, and also forms a useful etch stop when reactive ion etching (RIE) is used to remove subsequently formed insulating layers that are not part of the final structure. The seed layer 86 is typically deposited by sputtering a material having the same composition as that of film to be plated. The thickness of the seed layer 86 is about 0.1 microns to about 0.5 microns thick.

Formed above the seed layer 86 is a first insulation layer 88. The first insulation layer 88 may be formed of any electrically insulating material, such as silica, and may be formed by any suitable deposition technique such as CVD. The first insulation layer 88 should be at least as thick as the coil 68 will ultimately be, in the range of 0.5 microns to 2.0 microns.

FIG. 6C shows a first mask 90 disposed above and in contact with the first insulation layer 88. The first mask 90 is formed of photoresist and patterned by photolithography techniques well known in the art. The first mask 90 includes openings to expose the first insulation layer 88. These openings are situated above locations where portions of the first insulation layer 88 will subsequently be removed to create voids. The voids to be formed in the first insulation layer 88 will ultimately be filled with conductive materials to form the individual winds 69 of coil 68, and the second pole pedestal 58. In some embodiments a void in the first insulation layer 88 will also be created to allow for the subsequent formation of the backgap 62.

FIG. 6D illustrates a stage in the construction of the magnetic write structure after voids in the first insulation layer 88 have been formed. The voids may be created by RIE, for example, using the seed layer 86 as an etch stop. FIG. 6E shows the partially constructed magnetic write structure after the remnants of the first mask 90 have been removed by any appropriate stripping technique well known to the photolithography arts. The first insulation layer 88 is left with a pole pedestal void 92, at least one coil void 94, and in some embodiments a backgap void 96. FIG. 6F shows a plan view of the pattern of voids created in the first insulation layer 88 as viewed along the line 6F in FIG. 6E.

FIGS. 6G–6I illustrate the formation of coil 68, beginning with the formation of a second mask 98 having an aperture, wherein the aperture exposes at least one coil void 94. Except for the coil voids 94 exposed by the aperture, the second mask 98 otherwise completely covers the surface of the magnetic write structure being created. The second mask 98 is formed of photoresist and patterned by well known photolithography techniques.

FIG. 6H further illustrates the formation of coil 68. As previously noted, coil 68 is comprised of individual winds 69. The individual winds 69 are formed of an electrically conductive material such as copper within the coil voids 94 by any suitable technique, for example, by plating. The individual winds 69, once formed, should be about 0.5 microns to about 2.0 microns in thickness. Following the formation of the individual winds 69, the second mask 98 may be removed by any appropriate stripping technique. The removal of the second mask 98 completes the formation the coil 68. The partially constructed magnetic write structure is shown in FIG. 6I following the removal of second mask 98.

FIGS. 6J–6L show the formation of the second pole pedestal 58, and in some embodiments the backgap 62. In FIG. 6J a third mask 100 is formed of photoresist and patterned by photolithography techniques. The third mask 100 is patterned to cover the coil 68. An electrically conductive material, preferably with a high Bs value, is formed within the pole pedestal void 92, and in some embodiments the backgap void 96. This may be accomplished by any suitable technique known in the art, for example, by plating. The material deposited in the pole pedestal void 92, and in some embodiments the material deposited in the backgap void 96, should fill these voids to a thickness in the range of about 0.5 microns to about 2.0 microns. Examples of high Bs materials include nickel alloys containing iron in the 35% to 55% by weight range, such as Ni-35% Fe, Ni-45% Fe, and Ni-55% Fe. FIG. 6K shows the partially constructed magnetic write structure following the completion of this operation. FIG. 6K includes a second pole pedestal 58 and a backgap 62.

FIG. 6L illustrates the partially constructed magnetic write structure following the completion of the self-aligned array 102, comprising the coil 68, the second pole pedestal 58, and in some embodiments the backgap 62. The self-aligned array 102 is completed by removing the third mask 100, removing the remnants of the first insulation layer 88, and by removing the seed layer 86 from everywhere except where it is covered by the individual winds 69, the second pole pedestal 58, and the backgap 62. The seed layer 86 must be removed from these locations because otherwise it would create electrical short circuits. The third mask 100 may be removed by any appropriate stripping technique. The remnants of the first insulation layer 88 may be removed by any suitable technique such as ion milling. Lastly, the portions of the seed layer 86 exposed by the removal of the remnants of the first insulation layer 88 may themselves be removed by any suitable process such as RIE.

In some embodiments of the present invention forming the second pole pedestal 58 further involves narrowing the width of the second pole pedestal 58. Narrowing the width of the second pole pedestal 58 is desirable for narrowing the trackwidth the magnetic write structure ultimately will produce when used to transfer data to a magnetic disk 16. Narrowing the second pole pedestal 58 is shown in FIGS. 6M–6O. In FIG. 6M a fourth mask 104 is formed above and in contact with the coil 68. The fourth mask 104 is formed of photoresist and patterned by photolithography techniques. FIG. 6N shows a plan view of the partially completed magnetic write structure as viewed along line 6N in FIG. 6M. This figure shows the initial width W of the second pole pedestal 58 prior to the narrowing process, and the final width W' following the completion of the narrowing process. The width of the second pole pedestal 58 may be reduced from W to W', for example, by low angle ion milling. Narrowing the second pole pedestal 58 is completed by removing the fourth mask 104 by any appropriate stripping technique. FIG. 6O shows the partially completed magnetic write structure after the formation of the self-aligned array 102, and in some embodiments after the second pole pedestal 58 has been narrowed from a width of W to a width of W'.

FIG. 6P shows the formation of a second insulating layer 106 above and covering the self-aligned array. The second insulating layer 106 fills the spaces between individual winds 69 forming the wind insulators 70 shown in FIG. 5. The second insulating layer 106 also fills the space between the second pole pedestal 58 and its nearest individual wind 69', and the space between the backgap 62 and its nearest individual wind 69" forming, respectfully, the pole pedestal insulator 72 and the backgap insulator 74 shown in FIG. 5. The second insulating layer 106 may be formed of any electrically insulating material such as alumina or silica, and may be deposited by any suitable technique such as CVD.

The second insulating layer 106 is planarized to expose the second pole pedestal 58, and in some embodiments the backgap 62. FIG. 6Q shows the partially completed magnetic write structure following the planarization of the second insulating layer 106. Following planarization the second pole pedestal 58 has a first surface 108, the backgap 62 has a first surface 110, and the second insulating layer 106 has a first surface 112. All three of these surfaces are substantially coplanar with each other. Planarization may be accomplished by any suitable technique such as chemical mechanical polishing (CMP).

A conductive pole layer 52 is formed above and in contact with the second insulating layer 106, the second pole pedestal 58, and the backgap 62 as shown in FIG. 6R. Conductive pole layer 52 should be substantially parallel to the plane of conductive shield layer 32, and no more than 10° away from parallel. The conductive pole layer 52 may be formed from any electrically conductive material, however, high Bs materials such as CoNiFe alloys and nickel alloys containing iron in the 35% to 55% by weight range, such as Ni-35% Fe, Ni-45% Fe, and Ni-55% Fe work well for producing write elements for high density recording applications. The conductive pole layer 52 may be formed by any suitable fabrication technique such as plating. FIG. 6R also shows the plane 29 of the air bearing surface (ABS) that must be exposed to make the magnetic write structure operable. This may be accomplished by any suitable method such as grinding and lapping.

In summary, the present invention provides structures and methods for providing a magnetic recording device that can be used in high data density applications with improved write performance. The invention has been described herein in terms of several preferred embodiments. Other embodiments of the invention, including alternatives, modifications, permutations and equivalents of the embodiments described herein, will be apparent to those skilled in the art from consideration of the specification, study of the drawings, and practice of the invention. The embodiments and preferred features described above should be considered exemplary, with the invention being defined by the appended claims, which therefore include all such alternatives, modifications, permutations and equivalents as fall within the true spirit and scope of the present invention.

What is claimed is:

1. A compact MR read/write head, comprising:
a substrate including a conductive shield layer defining a plane;
an insulating write gap layer at least partially covering said conductive shield layer;
a self-aligned array comprising a conductive pole pedestal and a coil, said coil comprising a plurality of winds, said pole pedestal and said coil contacting said write gap layer, wherein a separation between said pole pedestal and a first of said winds of said coil is no greater than about 2.0 microns;
a conductive pole layer disposed over said coil and including a pole tip portion contacting said pole pedestal, said conductive pole layer including a portion disposed over said coil and said pole tip portion defining a plane which is substantially parallel to said plane of said conductive shield layer; and
a MR read element disposed within said substrate.

2. The compact MR read/write head as recited in claim 1 wherein said insulating write gap layer is provided with a backgap opening, and wherein said self-aligned array further comprises a backgap contacting said conductive shield through said backgap opening, and wherein a separation between said backgap and said coil is no greater than about 2.0 microns.

3. The compact MR read/write head as recited in claim 1 wherein an angle formed between said plane of said conductive pole layer and said plane of said conductive shield layer is less than about 10°.

4. The compact MR read/write head as recited in claim 1 wherein said substrate further comprises a first shield and a dielectric medium, said dielectric medium disposed below said conductive shield layer and including said MR read element, and said first shield disposed below said dielectric medium.

5. A magnetic data storage and retrieval system, comprising:
a) a read/write head, including
a substrate including a conductive shield layer defining a plane;
an insulating write gap layer at least partially covering said conductive shield layer;
a self-aligned array comprising a conductive pole pedestal and a coil, said coil comprising a plurality of winds, said pole pedestal and said coil contacting said write gap layer, wherein a separation between said pole pedestal and a first of said winds of said coil is no greater than about 2.0 microns;
a conductive pole layer disposed over said coil and contacting said pole pedestal, wherein said conductive pole layer including a portion disposed over said coil and said pole tip portion contacting said pole pedestal defines a plane which is substantially parallel to said plane of said conductive shield layer;
a MR read element disposed within said substrate;
b) a magnetic medium; and
c) a medium support capable of supporting said magnetic medium and moving said magnetic medium in relation to said read/write head.

6. The magnetic data storage and retrieval system as recited in claim 5 further comprising a read/write head support system for suspending said read/write head proximate said magnetic medium and including an actuator for moving said read/write head relative to said magnetic medium.

7. The magnetic data storage and retrieval system as recited in claim 5, wherein said medium support includes:
a spindle on which said medium can be supported, having an axis about which said medium can rotate; and
a medium motor connected to said spindle and capable of facilitating said moving of said medium relative to said compact MR read/write head.

8. The magnetic data storage system as recited in 5 wherein said insulating write gap layer is provided with a backgap opening, and wherein said self-aligned array further comprises a backgap contacting said conductive shield through said backgap opening, and wherein the separation between said backgap and said coil is no greater than about 2.0 microns.

9. The magnetic data storage system as recited in 5 wherein said substrate further comprises a first shield and a dielectric medium, said dielectric medium disposed below said conductive shield layer and including said MR read element, and said first shield disposed below said dielectric medium.

10. A magnetic write structure comprising:
   a conductive shield defining a plane;
   an insulating write gap layer at least partly covering said conductive shield layer;
   a self-aligned array comprising a conductive pole pedestal and a coil, said pole pedestal and said coil being disposed over said write gap layer, said coil comprising a plurality of winds, said pole pedestal and said coil contacting said write gap layer, said pole pedestal and a first of said winds of said coil having a separation therebetween no greater than about 2.0 microns; and
   a conductive pole comprising a pole tip portion, a portion situated over said coil, and a portion situated over said separation between said pole pedestal and said coil, wherein a slope of said conductive pole portion over said separation is less than about 10°.

11. A compact MR read/write head comprising:
   a substrate including a conductive shield layer defining a plane;
   an insulating write gap layer at least partly covering said conductive shield layer;
   a self-aligned array comprising a conductive pole pedestal and a coil comprising a plurality of winds, said pole pedestal and said coil being disposed over and contacting said write gap layer;
   a pole pedestal insulator situated in a separation between said pole pedestal and a wind nearest said pole pedestal; and
   a conductive pole comprising a pole tip portion, a portion situated over said coil, and a portion situated over said pole pedestal insulator, and a portion over the pole pedestal, wherein a slope of said conductive pole portion over said pole pedestal insulator is less than about 10°.

12. The magnetic write structure of claim 11 wherein the separation between said pole pedestal and said nearest wind is less than about 2.0 microns.

* * * * *